(12) United States Patent
Heyn et al.

(10) Patent No.: US 7,104,369 B2
(45) Date of Patent: Sep. 12, 2006

(54) VIBRATION DAMPER WITH STROKE-DEPENDENT DAMPING FORCE

(75) Inventors: Steffen Heyn, Schweinfurt (DE); Frank Gundermann, Marktsteinach (DE); Christian Böhm, Rannungen (DE); Bernd Zeissner, Volkach (DE); Manfred Grundei, Niederwerrn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/946,972

(22) Filed: Sep. 22, 2004

(65) Prior Publication Data

US 2005/0061592 A1  Mar. 24, 2005

(30) Foreign Application Priority Data

Sep. 23, 2003  (DE) .................. 103 43 875

(51) Int. Cl.
*F16F 9/48* (2006.01)
(52) U.S. Cl. ............ 188/288; 188/322.13; 188/322.15; 188/322.18; 188/322.22
(58) Field of Classification Search ............ 188/282.5, 188/282.6, 282.8, 283, 284, 288, 316, 317, 188/322.13, 322.15, 322.18, 322.22, 322.19
See application file for complete search history.

(56) References Cited

U.S. PATENT DOCUMENTS

| | | | | |
|---|---|---|---|---|
| 3,730,305 | A | * | 5/1973 | Fouts .................... 188/322.18 |
| 4,821,850 | A | | 4/1989 | Geiling et al. |
| 5,217,095 | A | * | 6/1993 | Lizell ..................... 188/266.5 |
| 5,219,414 | A | | 6/1993 | Yamaoka |
| 5,398,786 | A | | 3/1995 | Mintgen |
| 5,971,117 | A | * | 10/1999 | Grundei et al. ............. 188/288 |
| 6,179,100 | B1 | * | 1/2001 | Mintgen et al. ......... 188/282.1 |
| 6,644,445 | B1 | * | 11/2003 | Dodge .................... 188/282.6 |
| 6,651,787 | B1 | * | 11/2003 | Grundei .................... 188/280 |
| 6,776,269 | B1 | * | 8/2004 | Schel ......................... 188/287 |

(Continued)

FOREIGN PATENT DOCUMENTS

AT                 172400            9/1952

(Continued)

OTHER PUBLICATIONS

French Search Report dated Aug. 5, 2005, issued for FR Application No. 0410001.

*Primary Examiner*—Devon Kramer
(74) *Attorney, Agent, or Firm*—Cohen, Pontani, Lieberman & Pavane

(57) ABSTRACT

A piston rod with a piston is installed with freedom of axial movement in a damping medium-filled cylinder, where, as a function of the stroke position of the piston, a bypass connects the two working spaces separated from each other by the piston. The piston has at least one through-channel for at least one flow direction, which channel is at least partially covered on the outlet side by at least one valve disk, so that a first pressure-actuated surface to which pressure can be applied in the opening direction is present on the valve disk. In addition to the first pressure-actuated surface, the valve disk has a second pressure-actuated surface, which is separated from the first when the valve disk is closed and which can be actuated via the bypass, in which case the effects of the two pressure-actuated surfaces are additive. The second pressure-actuated surface of the valve disk, in addition to the first pressure-actuated surface of the valve disk, is designed with its throttle point in the area of the second pressure-actuated surface at least during a certain phase of the travel of the valve disk.

14 Claims, 3 Drawing Sheets

U.S. PATENT DOCUMENTS

| | | | |
|---|---|---|---|
| 2002/0027051 A1* | 3/2002 | Grundei | 188/322.15 |
| 2004/0245058 A1* | 12/2004 | Diederich et al. | 188/322.15 |
| 2005/0034944 A1 | 2/2005 | Grundei | |

FOREIGN PATENT DOCUMENTS

| | | |
|---|---|---|
| DE | 40 13 054 | 11/1990 |
| DE | 196 18 055 | 1/1998 |
| DE | 100 31 975 A1 | 1/2002 |
| FR | 2.088.644 | 12/1971 |
| FR | 2 851 630 | 8/2004 |
| GB | 1238508 | 8/1969 |
| GB | 2 231 385 | 11/1990 |

* cited by examiner

VIBRATION DAMPER WITH STROKE-DEPENDENT DAMPING FORCE

BACKGROUND OF THE INVENTION

1. Field of the Invention

The invention pertains to a vibration damper with stroke-dependent damping force of the type having a cylinder filled with damping medium and a piston rod connected to a piston in the cylinder, the piston separating the cylinder into a working space on the piston rod side and a working space away from the piston rod, the piston having at least one first through-channel with a respective at least one outlet for flow in a first direction. A bypass connects the working space on the piston rod side to the working space away from the piston rod as a function of the position of the piston in the cylinder. A first valve disk covers the outlet of the at least one first through-channel, the first valve disk being movable from a closed position to an open position and having a first pressure-actuated surface which is exposed to pressure via said at least one through channel.

2. Description of the Related Art

A piston-cylinder assembly with distance-dependent damping force characteristics is known from U.S. Pat. No. 5,971,117. The piston rod of the piston-cylinder assembly carries two pistons a certain distance apart, each of which can generate a damping force in either direction of piston rod movement. At least one bypass groove, which is longer in the axial direction than the distance between the piston rings of the two pistons, is formed in the cylinder of the piston-cylinder assembly. Thus, three different performance characteristics are produced. When both pistons are present in the stroke range within which the bypass groove extends, the damping force is determined by the cross section of the bypass groove. As the distance traveled by the piston rod increases, one of the pistons moves beyond the bypass groove, and an intermediate characteristic is obtained. As soon as the second piston has also left the area of the bypass groove, the hardest damping force characteristic goes into effect. For a vibration damper which is variable in this way, however, two pistons with at least four valve disks and possibly valve springs are required. This expense can be too high for certain concrete applications.

SUMMARY OF THE INVENTION

The task of the present invention is to simplify the design of a vibration damper with stroke-dependent damping force characteristics.

According to the invention, the valve disk also has a second pressure-actuated surface, which is separated from the first pressure actuated surface when the valve disk is closed and which can be actuated via the bypass, in which case the two pressure-actuated surfaces act additively. The second pressure-actuated surface of the valve disk, in addition to the first pressure-actuated surface of the valve disk, is designed with its throttle point in the area of the second pressure-actuated surface at least during a certain phase of the travel of the valve disk.

The advantage here is that the valve disk begins to open sooner than it would in the case of a damping force characteristic with a simple advance opening segment determined by the bypass, and therefore the system is adapted more comfortably overall to the chassis, especially at high piston rod velocities.

A bypass of simple design consists of a bypass groove. The bypass groove can have an inlet and/or and an outlet with a graduated cross-section. The effective cross-sectional ratios of the bypass groove make it possible for the pressure to change continuously at the second pressure-actuated surface, so that pressure surges which could lead to the sudden opening or closing of the valve are avoided. The bypass groove can be formed by an area of expanded diameter extending around the entire circumference of the cylinder.

As a further design elaboration, the valve disk is provided with a sealing sleeve, which extends at least from the pressure-actuated surface on the valve disk toward the assigned working space. The damping force characteristic can be determined by adjusting the ratio between the length of the valve sleeve and the length of the bypass groove.

So that the operating behavior can be defined, the sealing sleeve is provided with a seal acting in the direction toward the cylinder. In addition, the gap between the wall of the cylinder and the sealing sleeve is larger than that between the piston and the cylinder, so that any dimensional deviations within the valve as a whole can be compensated. A relatively large gap between the sealing sleeve and the cylinder reduces the throttling action inside the gap and improves to the same degree the intended axial movement of the sealing sleeve.

The piston with its through-channels for both flow directions is very easy to manufacture, because the minimum of one through-channel for the one flow direction of the damping medium is separated from the valve seat surfaces of the minimum of one through-channel for the other flow direction, where the width of the first pressure-actuated surface is determined by the two valve seat surfaces. The valve seats can be provided in the form of elevations either on the valve disk or on the piston. The advantage of having the valve seats on the valve disk is that different damping force characteristics can be provided simply by replacing the valve disk, which is much less expensive to do than replacing an entire piston.

The channel for the additional pressure-actuated surface can be realized very easily by having the second pressure-actuated surface extend radially outside the valve seat surfaces for the valve disks.

So that the vibration damper can provide the desired stroke-dependent damping force characteristic in both the inward and outward travel directions of the piston rod, a nonreturn valve is provided between the associated working space and a connection leading to the second pressure-actuated surface. This valve remains closed in the flow direction leading to the second pressure-actuated surface.

To simplify assembly, it is advisable for the valve disk and the sealing sleeve to be made as a single part.

In a design variant, the valve disk has an axial offset between the first and the second pressure-actuated surface, this axial offset forming a first part of the throttle point. The axial offset defines the distance over which the valve disk can travel in the area of the second pressure-actuated surface without the occurrence of a sudden drop in the backpressure in this area as a result of the outflow of damping medium.

The axial offset of the valve disk cooperates with an opposing contour of the piston to form the throttle point.

To obtain an especially large second pressure-actuated surface, the nonreturn valve provided for the associated working space forms the feed opening leading to the first pressure-actuated surface of the valve disk, so that damping force can be produced during the movement of the piston in the opposite direction.

As a function of the amount of space available, a seal can be installed inside the throttle space. A very small leakage gap proceeding from the second pressure-actuated surface has little or no effect on the function of this surface, but even this small effect can be eliminated by the installation of a seal.

Alternatively, the valve seat surface which separates the second pressure-actuated surface from the first pressure-actuated surface can be formed by a seal with axial elasticity, which provides a sealing action as a function of the stroke of the valve disk. For this purpose, for example, a ring-shaped seal can be placed on the top surface of the piston, so that the sealing action of the ring-shaped seal will be ensured over a relatively long axial pretensioning distance. Providing the valve seat with a 3-dimensional design of this type simplifies the design of both the valve disk and the piston surfaces.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
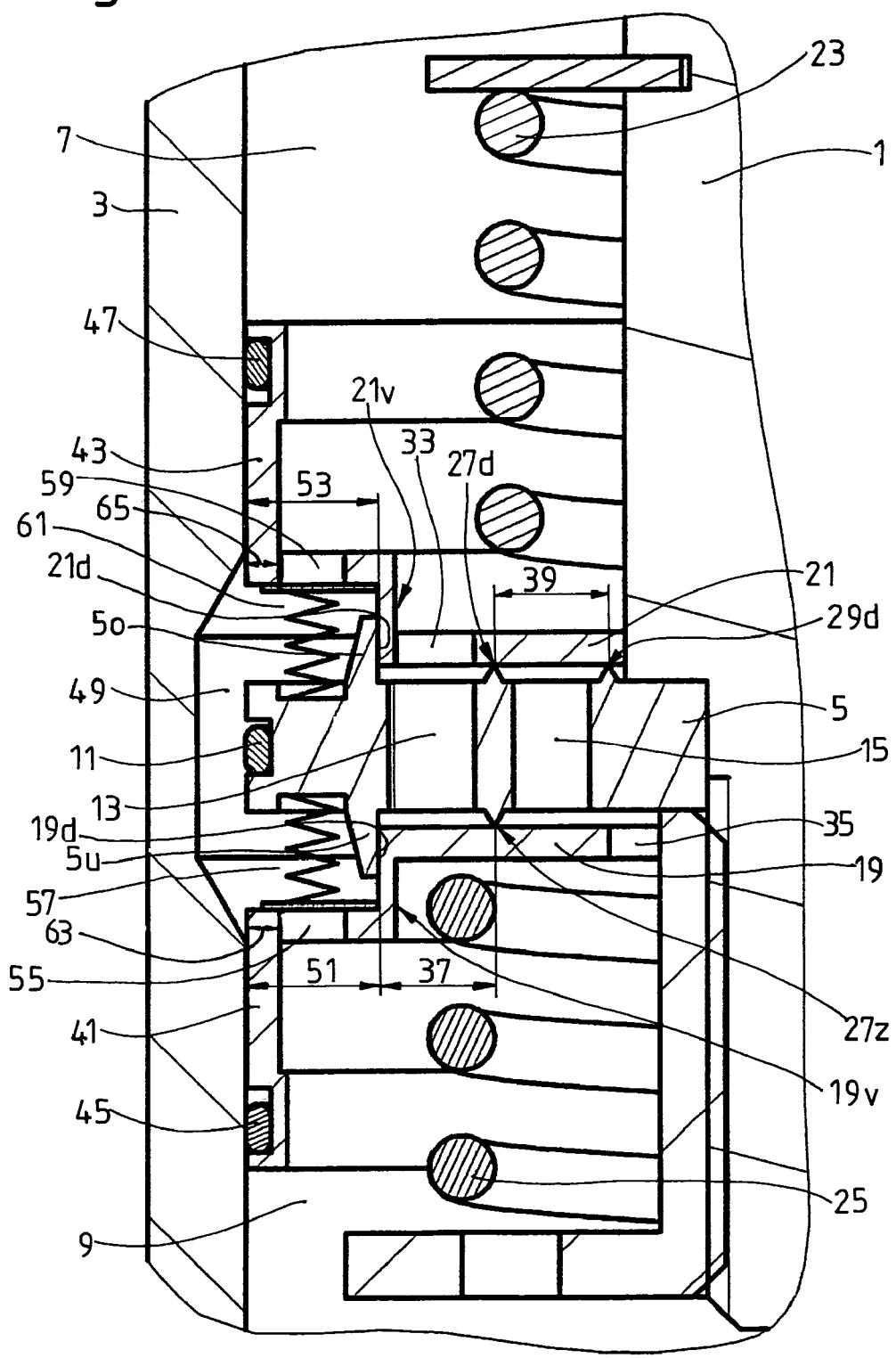
FIG. 1 is a partial axial section view of a first embodiment of vibration damper, having valve disks with an axial offset.

FIG. 1 shows part of a vibration damper of arbitrary design with the piston rod 1 in an intermediate stroke position with respect to a cylinder 3. The piston rod 1 carries a piston 5, which divides the cylinder into a-working space 7 on the piston rod side and a working space 9 on the side away from the piston rod. A piston ring 11 is mounted in the lateral surface of the piston. Inside the piston, at least one through-channel 13 is provided for the outward travel of the piston rod, and at least one through-channel 15 is provided for the inward travel. The outlet side of the through-channel 13 is covered by a valve disk 19, and that of the through-channel 15 is covered by a valve disk 21. The two valve disks are pretensioned by valve springs 23, 25 onto the valve seat surfaces 27d, 29d, and 27z. A connecting opening 33 aligned with the through-channel 13 is formed in the valve disk 21, and a connecting opening 35 leading to the through-channel 15 is formed in the valve disk 19.

The valve seat surface 27z defines a first circular-ring-shaped pressure-actuated surface 37 on the bottom (relative to the outward travel direction of the piston rod) of the valve disk; the pressure on this surface acts in opposition to the valve spring 25. In a corresponding manner, the valve seat surfaces 27d, 29d function as the boundaries of a first pressure-actuated surface 39 with respect to the inward travel direction of the piston rod.

Sealing sleeves 41, 43 are designed as integral parts of the two valve disks 19, 21; each of these sleeves carries a seal, referred to in the following as a "sealing sleeve seal" 45, 47, which acts in the direction facing the wall of the cylinder and is a certain distance away from the plane of the valve disk.

A bypass in the form of a bypass groove 49 is formed inside the cylinder, the effective length of the groove being preferably smaller in one direction of movement than the distance between the piston ring and the sealing sleeve seals 45, 47. The bypass groove 49 has an inlet 79 and an outlet 81 with graduated cross-sections to prevent pressure surges.

In addition, each of the two valve disks also has an axial offset 19v, 21v. These offsets, one for each direction of movement, separate the second pressure-actuated surfaces 51, 53 on the valve disks 19, 21 from the first pressure-actuated surfaces 37, 39. The top and bottom surfaces of the piston are designed with opposing contours 5o, 5u, so that the axial offsets form stroke-dependent throttle points 19d, 21d.

A connection 55, which is closed by a nonreturn valve 57 acting on the pressure-actuated surface 51, is formed in the valve disk 19. A connection 59, which is closed by a nonreturn valve 61 acting on the pressure-actuated surface 53, is also provided in the valve disk 21.

In the exemplary diagram, the effective length of the bypass groove 49 proceeding from the normal position is approximately half as long as the distance between the effective sealing edges of the piston ring 11 and the sealing sleeve seals 45, 47.

As the piston rod travels outward, the damping medium in the working space 7 on the piston rod side is compressed and flows through the connecting opening 33 and into the through-channel 13. In parallel, the nonreturn valve 61 opens and creates a flow path extending through the bypass groove 49 to the second pressure actuated surface of the valve disk 19. The sealing action of the piston ring is rendered inoperative by the bypass groove. As a function of the travel velocity of the piston rod, a backpressure builds up at the first pressure-actuated surface 37 and at the second pressure-actuated surface 51 of the valve disk 19; this backpressure acts in the direction which tries to lift the valve disk 19 from the valve seat surface 27z. The sealing sleeve seal 45 prevents damping medium from flowing past the sealing sleeve 41 via a gap between the sealing sleeve and the wall of the cylinder. As long as the valve disk 19 has still not been lifted from the valve seat surface 27z, small advance opening cross sections 63, 65, preferably located in the nonreturn valves 57 and 61, can produce connections between the working spaces and provide a relatively small damping force. Advance opening cross sections of this type can also be provided in the valve seat surfaces 27d, 29d. When the sum of the forces acting on the first pressure-actuated surface 37 and on the second pressure-actuated surface 51 becomes greater than the closing force exerted by the valve spring 25, the valve disk 19 rises from the valve seat surfaces 27z, 29z. The offset 19v of the valve disk 19 prevents damping medium from escaping from the space formed by the bypass groove 49 in conjunction with the pressure-actuated second surface 51, so that the backpressure acting on the second pressure-actuated surface 51 remains preserved independently of the stroke or at least within the initial phase of the stroke. Only after the offset is no longer overlapped axially by the opposing contour is it possible for damping medium to flow via the valve seat surface 27z into the working space 9 on the side away from the piston rod.

Thus, a first, more comfortable damping force characteristic is obtained, and it remains in effect until the piston ring 11 reaches the upper end of the bypass groove 49, at which point the piston ring is no longer hydraulically bridged. The second pressure-actuated surface 51 is thus no longer available as a surface on which force can be applied, and as a result of the advance opening cross section 63, the back-pressure acting on the second pressure-actuated surface is prevented from decreasing during the closing movement of the valve disk 19. The damping force characteristic is therefore determined now only by the first pressure-actuated surface 37.

When the piston rod travels inward toward the working space 9 on the side away from the piston rod, the corresponding valve components operate in the same way, starting from the normal position. Thus the damping medium can flow from the working space 9 via the connecting opening 35 in the valve disk 19 into the through-channel 15, where it comes in contact with the first pressure-actuated surface 39, which extends between the two valve seat surfaces 27*d*, 29*d*, of the valve disk 21. In parallel, the nonreturn valve 57 of the connection 55 in the valve disk 19 opens. In contrast, the nonreturn valve 61 is closed and thus generates the effect of the second pressure-actuated surface 53, which is superimposed additively on that of the first pressure-actuated surface 39. In this position of the piston, the sealing sleeve seal 47 is located outside the bypass groove 49. The series connection of the advance opening cross sections 63, 65 is also available for this direction of movement and makes it possible for the damping medium to flow from the working space 9 on the side away from the piston rod to the working space 7 on the piston rod side.

When the piston ring 11 reaches the bottom end of the bypass groove 49, only the first pressure-actuated surface 39 is again available for the further movement of the piston rod. When the valve disk 21 is raised, the damping medium can escape from the through-channel 15 via the valve seat surface 27*d* into the connecting opening 33 and thus reach the working space 7 on the piston rod side.

Figure 2:
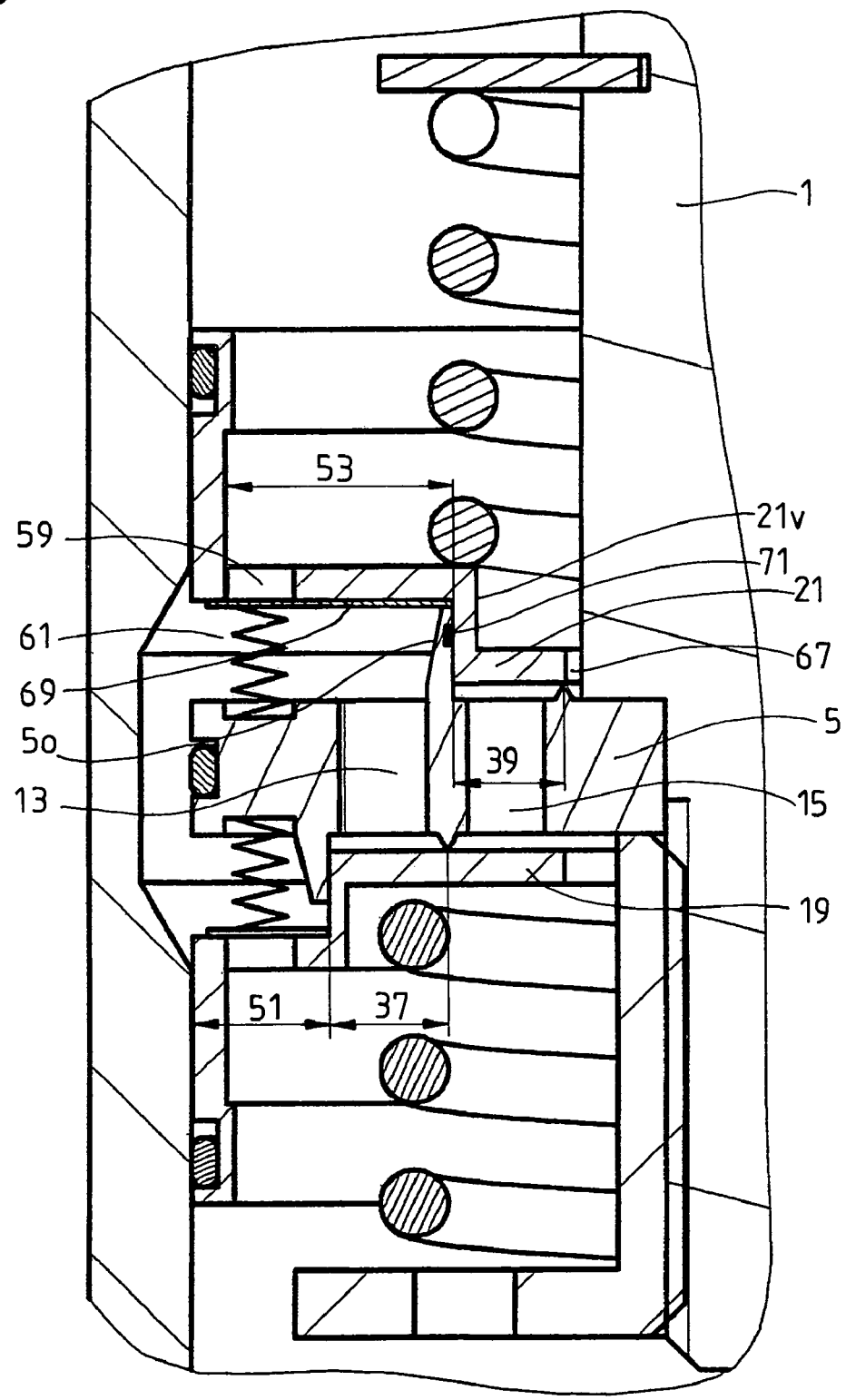
FIG. 2 is a partial axial section view of a second embodiment of vibration damper, having valve disks with an axial offset.

In FIG. 2, the same opening principle as that according to FIG. 1 is realized for the valve disks 19, 21 with first and second pressure-actuated surfaces. In contrast, however, the axial offset 21*v* of the valve disk is shifted to the area between the through-channels 13, 15. In addition, the connecting opening 33 is combined with the connection 59 of the nonreturn valve 61. Because of these measures, the second pressure-actuated surface 53 can be made much larger than that shown in FIG. 1, which makes it possible to improve the driving comfort. The outflow from the through-channel 15 proceeds via the inside diameter of the valve disk 21, i.e., through a gap 67 between the disk the piston rod 1.

If desired, a compression spring or an elastic disk 69 can be used for the nonreturn valve 61, which spring or disk is located between the top surface of the piston 5 in the area of the opposing contour 5*o* and the bottom surface of the valve disk 21 and which, when the flow arrives via the connection 59 in the direction toward the top surface of the piston, is able to undergo elastic deformation. With this variant, the height of the axial offset 21*v* can be reduced, because not as much space is required to accommodate the nonreturn valve. It is also shown that a seal 71 can be installed inside the throttle point of the axial offset to prevent even the slightest leakage and thus loss of backpressure at the second pressure-actuated surface 53.

Figure 3:
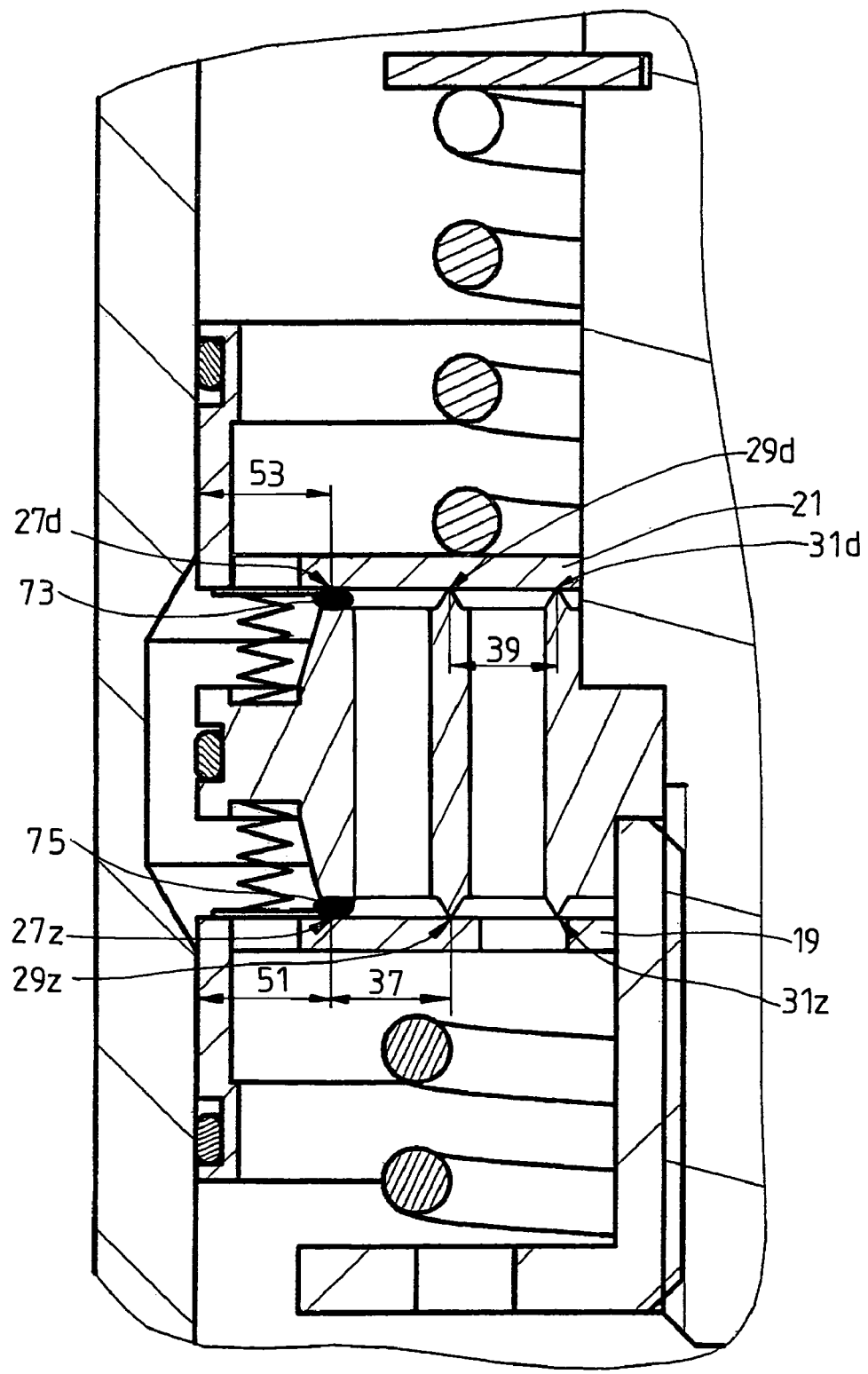
FIG. 3 is a partial axial section view of a third embodiment of vibration damper, having a piston with a seal with axial elasticity as a seating surface for the valve disk.

The point of FIG. 3 is to show that the valve disks 19, 21 do not necessarily have to be designed with an axial offset to produce a throttle point. In contrast to FIG. 1, three valve seat surfaces 27*d*, 29*d*, 31*d*, 27*z*, 29*z*, 31*z* are used per side of the piston, where the valve seat surfaces 27*d*, 27*z* are formed by axially elastic seals 73, 75, which separate the second pressure-actuated surfaces 51, 53 from the first pressure-actuated surfaces 37, 39. When a flow of damping medium arrives at the second pressure-actuated surface, the valve disk can rise from the valve seat surfaces 29*d*, 31*d* or 29*z*, 31*z* and thus produce a flow connection between the two working spaces; at the same time it is impossible for pressure medium to flow from the second pressure-actuated surface to the adjacent working space, because the seal 73, 75 is still preventing this particular flow of pressure medium.

It would also be possible to use the axially elastic seal as a valve seat surface 29*d*, 29*z* according to the principle of FIG. 2 and to omit the valve seat surfaces 27*d*, 27*z*, in which case the connections of the nonreturn valves and the connecting openings for the through-channels can again be combined in the valve disks.

The invention is not limited by the embodiments described above which are presented as examples only but can be modified in various ways within the scope of protection defined by the appended patent claims.

We claim:

1. A vibration damper comprising:
    a cylinder filled with damping medium;
    a piston rod connected to a piston in said cylinder, said piston separating said cylinder into a working space on the piston rod side and a working space away from the piston rod, said piston having at least one first through-channel with a respective at least one outlet for flow in a first direction;
    a bypass which connects the working space on the piston rod side to the working space away from the piston rod as a function of the position of the piston in the cylinder; and
    a first valve disk covering said outlet of said at least one first through-channel, said first valve disk being movable from a closed position to an open position, said first valve disk having a first pressure-actuated surface and a second pressure-actuated surface which are separated when the first valve disk is in the closed position, said first pressure-actuated surface being exposed to pressure via said at least one through channel, said second pressure-actuated surface being exposed to pressure via said bypass as a function of the position of the piston in the cylinder.

2. A vibration damper as in claim 1 wherein said piston further comprises at least one second through-channel with a respective at least one outlet for flow in a second direction opposite to said first direction, said damper further comprising a second valve disk covering said outlet of said at least one second through-channel, said second valve disk being movable from a closed position to an open position, said second valve disk having a first pressure-actuated surface and a second pressure-actuated surface which are separated when the second valve disk is in the closed position, said first pressure-actuated surface of said second valve disk being exposed to pressure via said at least one second through channel, said second pressure-actuated surface of said second valve disk being exposed to pressure via said bypass as a function of the position of the piston in the cylinder.

3. A vibration damper as in claim 1 wherein said bypass is formed by a groove in said cylinder.

4. A vibration damper as in claim 2 wherein each said valve disk is provided with a sealing sleeve which extends from a respective said second pressure actuated surface toward a respective said working space.

5. A vibration damper as in claim 4 wherein each said sleeve is formed as one piece with a respective said valve disk.

6. A vibration damper as in claim 4 further comprising a seal effective between each said sleeve and the cylinder.

7. A vibration damper as in claim 6 wherein said piston comprises a piston ring which can bear against said cylinder, said piston ring being spaced from each said seal at a distance which is less than the length of the bypass.

8. A vibration damper as in claim 2 further comprising a valve seat separating said first through-channel from said second through-channel at said first valve disk, and a second valve seat separating said first flow-through channel from said second flow-through channel at said second valve disk.

9. A vibration damper as in claim 8 wherein said second pressure-actuated surfaces lie radially outside of said valve seat surfaces.

10. A vibration damper as in claim 2 further comprising a connection in each of said valve disks and a nonreturn valve in each of each of said connections, each said nonreturn valve opening to expose the second pressure-actuating surface of the other valve disk to pressure.

11. A vibration damper as in claim 1 wherein said valve disk has an axial offset between said first and second pressure-actuated surfaces.

12. A vibration damper as in claim 11 wherein said piston has a contour which cooperates with said axial offset to form a throttle point.

13. A vibration damper as in claim 12 further comprising a seal at said throttle point.

14. A vibration damper as in claim 2 further comprising an axially elastic valve seat separating said first pressure-actuated surface from said second pressure-actuated surface at said first valve disk, and an axially elastic valve seat separating said first flow-through channel from said second flow-through channel at said second valve disk, whereby each said seal is effective as a function of axial movement of the respective valve disk relative to the piston.

* * * * *